United States Patent [19]

Koshelev

[11] Patent Number: 4,783,986
[45] Date of Patent: Nov. 15, 1988

[54] ANTI-VIBRATION MOUNTING FOR SHOCK-OR VIBRATION-PRODUCING MACHINERY

[75] Inventor: Valery P. Koshelev, Gorky, U.S.S.R.

[73] Assignee: Gorkovsky Politekhnichesky Institut, Gorky, U.S.S.R.

[21] Appl. No.: 51,462

[22] PCT Filed: May 29, 1986

[86] PCT No.: PCT/SU86/00047
§ 371 Date: Mar. 23, 1987
§ 102(e) Date: Mar. 23, 1987

[87] PCT Pub. No.: WO87/00458
PCT Pub. Date: Jan. 29, 1987

[51] Int. Cl.[4] .............................................. B21J 13/00
[52] U.S. Cl. .................................... 72/455; 100/214; 248/637; 248/638; 248/678; 72/456
[58] Field of Search .................. 72/455, 456; 100/214; 248/637, 638, 678, 679

[56] References Cited

U.S. PATENT DOCUMENTS 3,316,749  5/1967  Beard ..................................... 72/455

FOREIGN PATENT DOCUMENTS 130909   6/1949  Australia ............................. 248/638
623625   9/1978  U.S.S.R. ............................... 72/455
889251  12/1981  U.S.S.R. .
1074648  2/1984  U.S.S.R. .
1153144  4/1985  U.S.S.R. .

OTHER PUBLICATIONS

"Vibraizolyatsii Shtampovachnykh Molotov", I. V. Klimov, Moscow, Mashinostroenie, 1979, pp. 49–53.
"Vibroizolyatsia Shtampovachnykh Molotov", I. V. Klimov, Machinostroenie, 1979, pp. 75, 76.

Primary Examiner—David Jones
Attorney, Agent, or Firm—Lilling & Greenspan

[57] ABSTRACT

An anti-vibration mounting for shock-or-vibration producing machinery, having leaf springs (1) whose straps (3) fit into recesses (6) of a bed plate (4) of the machine and ends (7) of every leaf spring (1) rest on a separate support (9) at a height H above a foundation (11) which is decided by the condition $$H > 2(h + \delta),$$

where
h=depth of the recess (6) for the strap (3) of the leaf spring (1) in the bed plate (4) of the machine; and
$\delta$=static deflection of the leaf spring (1).

5 Claims, 2 Drawing Sheets

ANTI-VIBRATION MOUNTING FOR SHOCK- OR VIBRATION-PRODUCING MACHINERY

BACKGROUND OF THE INVENTION

1. Field of the Invention

The present invention relates to heavy-duty processing and power-generating plants and has specific reference to anti-vibration mountings for shock- or vibration-producing machinery.

2. Description of the Prior Art

The impact loads of significant magnitude which are set up by operating shock- or vibration-producing machinery and are sustained by their foundations cause rapid foundation failure.

Moreover, spreading through the soil to the foundations of adjacent buildings such loads bring about their non-uniform settlement leading to gradual deterioration.

The reconditioning of damaged foundations is an intricate, lasting and coastly operation.

Known in the art is an anti-vibration mounting for die-forging hammers comprising an inertial block and isolators in the form of springs and dampers. The anvil block of the hammer rests on the inertial block, a wooden or rubber pad being interposed therebetween, and the isolators support the inertial block, being interposed between the foundation and the block (see, e.g., book "Vibraizolyatsii shtampovachnykh molotov", by I. V. Klimov, V. P. Koshelev, V. S. Nosov, Moscow "Mashinostroenie" Publishers, 1979, pp. 49–53, in Russian).

The impact loads come on the inertial block and are smoothed out by the springs and dampers located under the inertial block. But the inertial block itself has no protection against vibration, and therefore deteriorates rapidly.

To renew an anti-vibration mounting which is in bad repair, the hammer must be taken apart, the damaged inertial block, springs, dampers removed and replaced by new ones. This is a time- and money-consuming job.

Modern practice dispenses with the inertial block in shock- or vibration-producing machinery and places isolators and dampers directly under the machine.

There is known an anti-vibration mounting of forging hammers comprising leaf springs which are located in the pit directly below the anvil block and rest on supports placed on the foundation. Resilient pads are interposed between the supports and the foundation, and the base of the anvil block is provided with recesses into which the straps clamping the leaf springs (see, e.g., book "Vibroizolyatsia shtampovchnykh molotov" by I. V. Klimov, V. P. Koshelev, V. S. Nosov, Moscow, "Machinostroenie Publishers, 1979, pp.75–76, in Russian).

The known anti-vibration mounting is the prototype of the invention.

In the known anti-vibration mounting referred to hereinabove, a number of leaf springs rest with their ends on a common support which is a flat plate. These springs differ in their behaviour-for different are their dimensions, coefficients of friction, etc.—and interact with each other in operation through the common support, bringing about additional loads detrimental to their condition.

A failure of some of the springs causes the centre where the anti-vibration mounting is supported to displace out of true with the centre of gravity of the hammer. As a result, this begins to rock and imposes additional loads on the springs. All in all, the performance and reliability of the hammer are impaired.

The rocking of the machine is eliminated by renewing the damaged springs. To that end the machine must be jacked up—a job sometimes inviting many technical difficulties.

Clearances between ends of leaf springs and a flat support may get stopped with scale. This will shift the points of support of the springs involved away from their ends. The stiffness of these springs will change and the support will tend to displace from under the springs. The centre-of-gravity location of the hammer as a whole will get out of true with the result that the reliability and durability of the hammer will be impaired.

SUMMARY OF THE INVENTION

The main object of the invention is to provide an anti-vibration mounting for shock- or vibration-producing machinery wherein the leaf springs are arranged so as to improve the reliability and durability of both the anti-vibration mounting and the machine.

This object is realized by providing an anti-vibration mounting for shock- or vibration-producing machinery incorporating leaf springs the straps of which fit into recesses of the bed plate of the machine and the ends of which rest on supports placed on the foundation wherein according to the invention the ends of every leaf spring rest on separate supports at a height H above the foundation which is determined by the condition $$H > 2(h + \delta),$$

where
  $h$ = depth on which the strap U of the leaf spring fits into the bed plate of the machine; and
  $\delta$ = static deflection of the leaf spring.

It is expedient that every support is T-shaped and located so shat the flange faces the foundation and the web upright or posts supports an end of a leaf spring.

Such supports can be easily made and are reliable in operation. They impart stability to the leaf springs, uniformly distribute the load over the foundation and prevent scale from entering the clearances which every end of the springs make with the support.

It is also expedient that the leaf springs are arranged in two tiers so that the straps of the upper tier rest on the straps of the lower tier and the web of every support is adapted to receive the ends of the leaf springs of both tiers a distance apart equalling the height of the straps.

The two-tier arrangement of the leaf springs is practical when a given number of these springs required to support a given high load must be accomodated under a bed plate of comparatively small dimensions.

Also disclosed is a forging hammer the anvil block of which rests on a anti-vibration mounting made up according to the invention described above with a portion of the anvil block and the anti-vibration mounting being immersed into a fluid.

The fluid in which the anti-vibration mounting and partly the anvil block are immersed serves as a lubricant which reduces the friction between the leaf springs and improves their performance as isolators. Apart from that, the fluid functions as a secondary spring-mass system dampening the vibration.

It is preferred that a space which opends downwards is provided in the base of the anvil block.

The air trapped in the space enhances the effect of dampening, functioning as an additional springly element linking the anvil block to the secondary spring-mass system (the fluid). The air also prevents the audible frequencies of the anvil block from reaching the foundation through the fluid.

The anti-vibration mounting for shock- or vibration-producing machinery is provided in accordance with the invention combine simplicity with reliability and durability and permit comparatively rapid replacement of defective leaf springs without jacking up the hammer.

BRIEF DESCRIPTION OF THE DRAWINGS

A preferred embodiment of the invention will now be described by way of an example with reference to the accompanying drawings in which.

DESCRIPTION OF THE PREFERRED EMBODIMENTS

The anti-vibration mountings described as the preferred embodiments of the invention are used to support a forging hammer.

Figure 1:
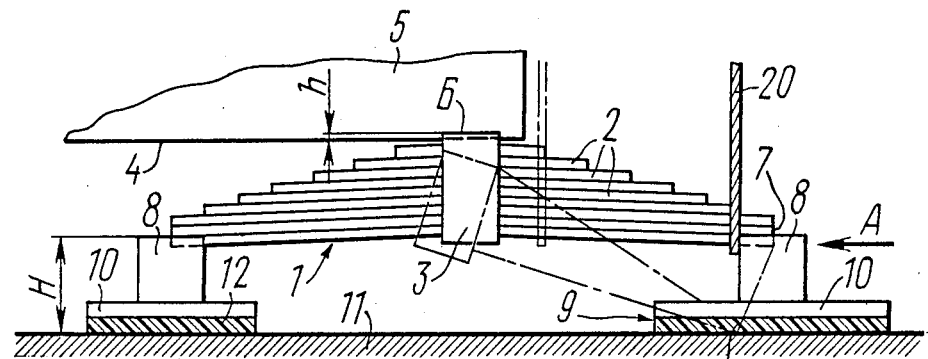
FIG. 1 is a front elevation of an anti-vibration mouting according to the invention.

Referring to FIG. 1, each of the anti-vibration mountings comprises leaf springs 1, referred hereinafter as springs 1, the individual members 2 of which are clamped with straps 3. Recesses 6 in the form of milled grooves wherein the bearing surfaces of the straps 3 are provided in the base 4 of the anvil block 5 of the hammer (not shown) to prevent the springs 1 from sliding over the surface of the base 4.

Beads built up by welding can replace the recesses or the springs can be fixed by pins each press-fitted at one end into the straps and fitting with the other end into a blind hole provided in the base of the anvil block.

The recesses 6 in the base 4 of the anvil block 5 have a depth h which is selected so as to definitely prevent the springs 1 from displacing horizontally over the base 4 of the anvil block 5.

Every end 7 of the springs 1 fits into a groove in the web 8 of a separate T-shaped support 9 the flange 10 of which faces the foundation 11 and rests on a resilient ped 12.

The ends 7 of the springs 1 are free to displace horizontally within the bounds determined by the elastic shear deformations of the pads 12 which are set up by the dynamic and static loads of the hammer. The amount of the displacements depends on the size of the pads 12 and the resiliency of their material.

Friction holds the resilient pads 12 fast to the surface of the foundation 11 and that of the supports 9.

The ends 7 of every spring 1 are located in separate supports 9 at a height H above the foundation 11 which is determined by the condition $$H > 2(h + \delta),$$

where h = depth to which the straps of a spring 1 fits into the base 4 of the anvil block 5; and δ = static deflection of a spring 1 which is defined by the weight bearing on the spring 1 and the stiffness of the material thereof.

The springs 1 resting on the T-shaped supports 9 at a height H above the foundation 11 have a good horizontal stability due to the fact that the supports 9 rest on their flanges 10 which uniformly distribute the load imposed by the springs 1 over the resilient pads 12 and the foundation 11.

Figure 2:
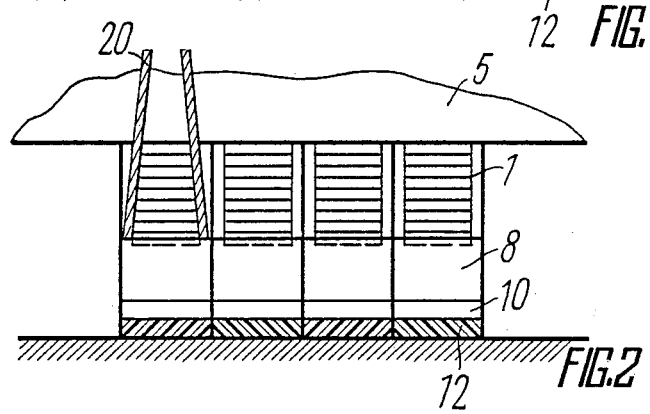
FIG. 2 is a view in the direction of arrow A in FIG. 1.

Referrings to FIG. 2, the springs 1 are arranged in rows under the anvil block 5. At least one end 7 of every spring 1 extends beyond a side of the anvil block 5 and is supported there by the corresponding support 9 (FIG. 1). This layout of the springs 1 increases the base of the hammer and improves the latter's stability. It is recommended for use when the mass of the dropping parts of the hammer is less than 10 t.

Figure 3:
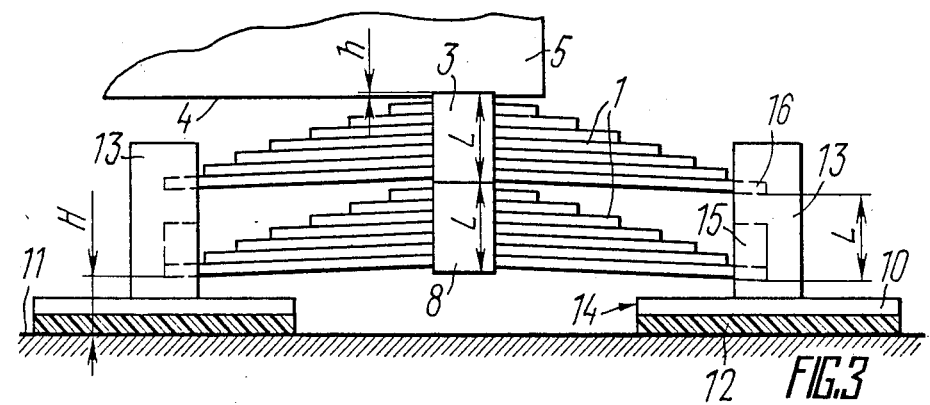
FIG. 3 illustrates the two-tier arrangement of the leaf springs.

For heavier hammers, it is preferred to arrange the springs 1 in two tiers so that the straps 3 of the upper tier rest on the straps 3 of the lower tier and the web 13 (FIG. 3) of every support 14 receives the ends 7 of the springs 1 of both tiers which are spaced a distance apart equalling the height, L, of strap 3. The ends 7 of the springs 1 in the lower tier are located at a height H above the foundation 11 which is determined decided by the above formula. The strap of every spring 1 in th above upper tier is fixed in the base 4 of the anvil block 5 in any of the ways described above. The ends 7 of the springs 1 in the lower tier are held fast in the webs 13 of the supports 14 by means of grooves 15, and the ends 7 of the springs 1 in the upper tier are held fast in the webs 13 of the supports 14 by means of recesses 16. A similar recess is provided in every web 8 (FIG. 1) giving support just to one springs 1.

The springs can also be held fast in the webs of the supports by any other suitable means.

Figure 4:
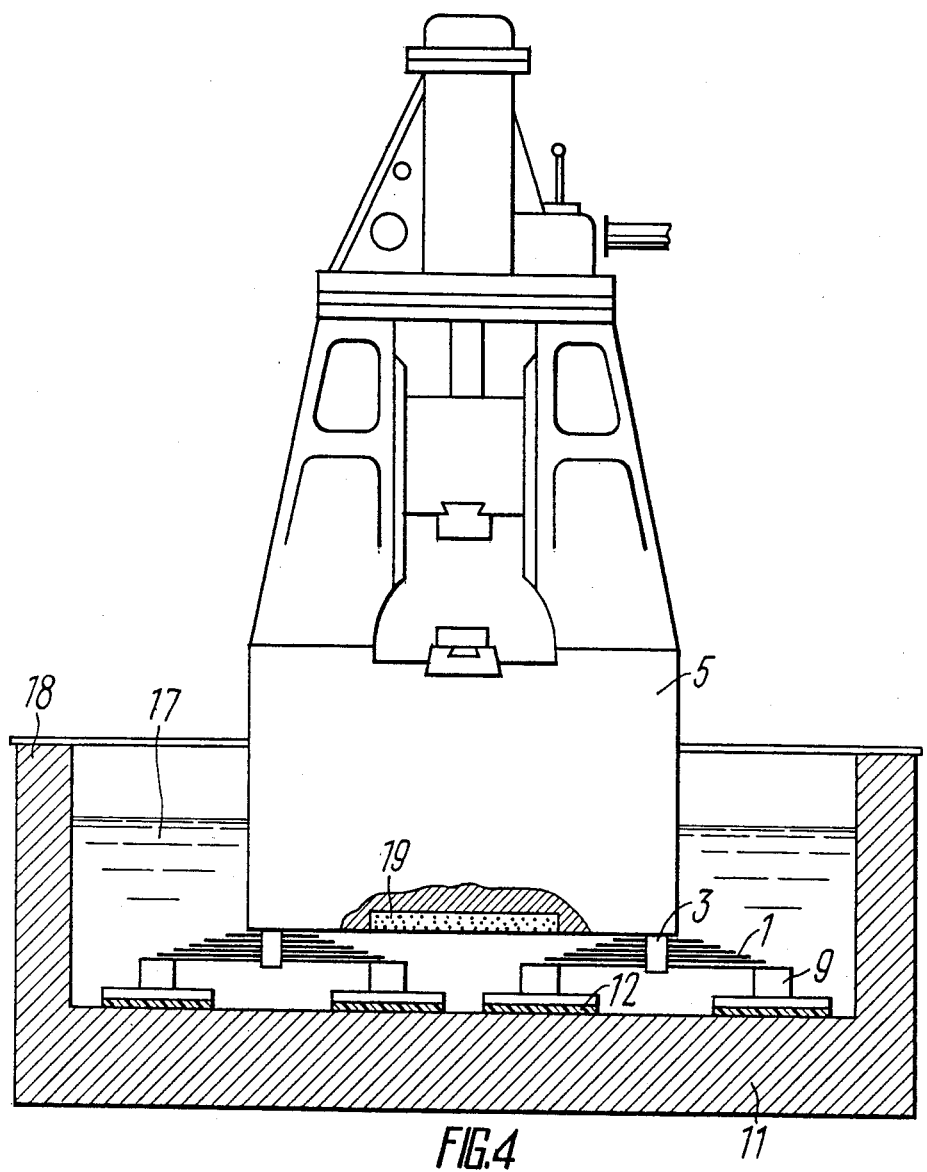
FIG. 4 illustrates a vibration-insulated hammer supported by the anti-vibration mountings according to the invention, the anvil block of the hammer and the mounting being immersed into a fluid.

FIG. 4 illustrates a hammer supported by an anti-vibration mounting which is described hereinabove and works by being immersed into a fluid 17 contained in a pit 18 below the hammer. The anvil block 5 is also partly immersed into the fluid 7. A space 19 open from below and containing air is provided in the base of the anvil block 5.

This setup enhances the damping effect of the anti-vibration mounting. It can easily be renewed, if necessary, by draining the pit from the fluid.

When the mounting is used to support a forging hammer, the resilient pads 12 are placed on the horizontal bearing surface of the foundation 11 and the supports 9 are superimposed on the pads 12. The springs 1 are placed so that their ends 7 fit into the webs 8 of the supports 9 and their straps 3 fit into the recesses 6 in the base 4 of the anvil block 5. The high-energy pulse the anvil block 5 sustains in operation over a wide range of frequencies and velocities is absorbed by the springs 1 of the anti-vibration mounting.

To enable the springs 1 to compress in carrying the impact load, their ends 7 must have some amount of displacement integrally with the supports 9. The properties of the resilient pads 12 permit this.

Every support 9 linked with the anvil block 5 through the spring 1 and with the foundation 11 through the resilient pad 12 functions as an absorber of high-frequency vibrations.

When the forging hammer is an operation, scale commonly accumulates between the springs 1 and the foundation 11 even if the plating (not shown) is tight.

By fitting the ends 7 of the springs 1 to the supports 9 at a height H above the foundation 11, compacting of the scale with the lower members 2 of the springs 1 is prevented.

Sustaining high loads in operation, the springs 1 are severely stressed parts which rapidly wear away and need replacement.

To renew a defective spring, it must be removed from its place under the anvil block 5.

A wire rope 20 (FIGS. 1 and 2) or any other suitable appliance is applied to the end 7 of the defective spring 1 at the web 8 of the support 9 which is located at a distance away from the anvil block 5, and the end 7 is heaved clear of the web 8 with the aid of a crane, jack, winch or pulley. The support 9 is removed and so is the resilient pad 12, and the lifted end 7 is lowered to the foundation 11. The defective spring 1 is so relieved of load, and the strap 3 is removed from the recess 6 in the base 4 of the anvil block 5. The wire rope 20 is shifted to the midlength of the spring 1 and this is then easily removed, being balanced. The support 9 at the other end of the removed spring 1 is left in its place.

A new spring is fitted by reversing the above procedure. An end 7 of the new spring 1, suspended from the wire rope 20, is lowered on the support 9 which has been left in its place. The rope 20 is shifted along the spring 1 to a point short of the opposite end 7 so as to leave some room for fitting this end to the web 8. The end 7 is lifted with the rope 20 to a height enabling the support 9 and the resilient pad 12 to be fitted into their places. At this stage, the strap 3 must fit into the recess 6 in the base 4 of the anvil block 5. The resilient pad 12 and the support 9 are returned into their places, and the lifted end 7 of the spring 1 is lowered into the recess in the web 8 of the support 9. On removing the wire rope 20, the hammer is ready for operation.

In the case of the two-tier arrangement of the springs, the operation of renewing a defective spring is the same as described above save that the ends 7 of the springs 1 in both tiers should be heaved.

Also unchanged is the above procedure when the disclosed antivibration mounting is immersed into a fluid and so is a portion of the anvil block. Only the fluid should be drained before a rapair.

The disclosed anti-vibration mounting has been tested in conjunction with a number of forging hammers of various capacities andd applications. They have proved a comparatively high reliability and long durability of the mounting combined with its comparatively good vibration-damping performance. The job of renewing a damaged spring is done by one man for 15-20 min.

The invention holds out special promise during the jobs of installing forging hammers or presses on their foundations.

It may also be of utility in placing steam and gas turbines, crushers, grinding mills and other machinery of the same kind on foundations.

The laying of foundations at construction sites in seismic regions is also a possible field of application.

What we claim is:

1. An anti-vibration mounting for shock or vibration-producing machinery, comprising leaf springs (1) formed of a plurality of individual spring members (2) secured to each other by straps (3), said strap members adapted to be received within recesses (6) of a base (4) of a machine, said springs having ends (7); supports (9,14) at each end of said leaf springs (1) placed on a foundation (11) for supporting said ends (7) of said leaf springs (1), characterized in that said ends (7) of each leaf spring (1) rest on a separate one of said supports (9, 14) at a height H above the foundation (11) which is determined by the condition $$H > 2(h+\delta),$$

where
  $h$ = depth to which the strap (3) of the leaf spring (1) fits into the base of the machine; and
  $\delta$ = static deflection of the leaf spring (1).

2. An anti-vibration mounting as claimed in claim 1, characterized in that each support (9,14) is T-shaped and comprised of a flange (10) with a post (8,13) mounted thereon, each support (9,14) being arranged so as to position an associated flange (10) facing the foundation (11) and an associated post (8,13) supporting an end (7) of said leaf springs (1).

3. An anti-vibration mounting as in claim 2, characterized in that the leaf springs (1) are arranged in upper and lower tiers each having associated straps (3), said straps (3) of the upper tier resting on said straps (3) of the lower tier and said post (13) of each support (14) receiving said ends (7) of said leaf springs of both tiers a distance (L) apart equalling the height of said strap (3).

4. A forging hammer, an anvil block of which rests on an anti-vibration mounting, characterized in that the anti-vibration mounting and a portion of the anvil block (5) are immersed into a fluid, wherein the anti-vibration mounting comprises leaf springs (1) formed of a plurality of individual spring members (2) secured to each other by straps (3) adapted to be received within recesses (6) of a base (4) of a machine, said springs having ends (7); supports (9,14) at each end of said leaf springs (1) placed on a foundation (11) for supporting said ends (7) of said leaf springs (1), characterized in that said ends (7) of each leaf spring (1) rests on a separate one of said supports (9,14) at a height H above the foundation (11) which is determined by the condition $$H > 2(h+\delta)$$

where
  $h$ = depth to which the trap (3) of the leaf spring (1) fits into the base of the machine; and
  $\delta$ = static deflction of the leaf spring (1).

5. A forging hammer as in claim 4, characterized in that a space (19) which opens downwards is provided in the base of the anvil block (5).

* * * * *